United States Patent
Sullivan et al.

(10) Patent No.: US 9,160,745 B1
(45) Date of Patent: Oct. 13, 2015

(54) DATA COUNTER MEASURES

(75) Inventors: Nick P. Sullivan, Pleasanton, CA (US); Vivek S. Vaidya, Mountain View, CA (US); Tom A. Chavez, San Francisco, CA (US)

(73) Assignee: Krux Digital, Inc., San Francisco, CA (US)

( * ) Notice: Subject to any disclaimer, the term of this patent is extended or adjusted under 35 U.S.C. 154(b) by 18 days.

(21) Appl. No.: 13/476,439

(22) Filed: May 21, 2012

Related U.S. Application Data

(60) Provisional application No. 61/487,866, filed on May 19, 2011.

(51) Int. Cl.
- G06F 7/04 (2006.01)
- H04L 29/06 (2006.01)
- H04L 29/08 (2006.01)

(52) U.S. Cl.
CPC ................ H04L 63/10 (2013.01); H04L 67/02 (2013.01); *H04L 63/08* (2013.01)

(58) Field of Classification Search
CPC ......... H04L 67/02; H04L 63/02; H04L 63/08; H04L 63/10; H04L 63/20; H04L 63/0428; H04L 29/06
See application file for complete search history.

(56) References Cited

U.S. PATENT DOCUMENTS

| | | | | |
|---|---|---|---|---|
| 7,685,425 | B1* | 3/2010 | Wright et al. | 713/176 |
| 7,757,002 | B2* | 7/2010 | Penton et al. | 709/246 |
| 7,769,766 | B1* | 8/2010 | Dubrovsky et al. | 707/754 |
| 7,984,500 | B1* | 7/2011 | Khanna et al. | 726/22 |
| 8,844,028 | B1* | 9/2014 | Cheng | 726/22 |
| 2003/0188189 | A1* | 10/2003 | Desai et al. | 713/201 |
| 2004/0146048 | A1* | 7/2004 | Cotte | 370/352 |
| 2004/0153889 | A1* | 8/2004 | Yingling | 714/57 |
| 2005/0216856 | A1* | 9/2005 | Matti | 715/768 |
| 2008/0244740 | A1* | 10/2008 | Hicks et al. | 726/22 |
| 2009/0282479 | A1* | 11/2009 | Smith et al. | 726/22 |
| 2012/0090026 | A1* | 4/2012 | Andrews et al. | 726/22 |
| 2014/0317754 | A1* | 10/2014 | Niemela et al. | 726/26 |

* cited by examiner

*Primary Examiner* — Eleni Shiferaw
*Assistant Examiner* — Gregory M Elmore
(74) *Attorney, Agent, or Firm* — Van Pelt, Yi & James LLP

(57) ABSTRACT

Techniques to block unwanted third party calls are disclosed. In various embodiments, an indication is received that third party code included on a web page is attempting to write to the web page content associated with an unauthorized third party call. The unauthorized third party call is blocked. In some embodiments, the unauthorized third party call is blocked by blocking the web page content associated with the unauthorized third party call from being written to the web page.

28 Claims, 5 Drawing Sheets

DATA COUNTER MEASURES

CROSS REFERENCE TO OTHER APPLICATIONS

This application claims priority to U.S. Provisional Patent Application No. 61/487,866 entitled DATA COUNTER MEASURES filed May 19, 2011 which is incorporated herein by reference for all purposes.

BACKGROUND OF THE INVENTION

Online publishers often include third party content on their web pages. These third parties provide services that include, but are not limited to: analytics, advertising, widgets that add functionality for end users, and behavioral tracking. These third party services typically are provided at least in part by embedding onto a first party publisher's web pages a snippet of third party HTML and JavaScript code.

This HTML and JavaScript code, once executed, performs the functionality that the publisher originally intended, but may also bring in requests, such as data collection requests, that were not authorized by the publisher, such as requests by and/or on behalf of unwanted third parties. These data collection requests can be in the form of images (most common), scripts, or iframes—theoretically any tag that creates an HTTP transaction. As an example, and without limitation, a first party publisher's web page (for example, an Autos site that is used by consumers to compare car prices) may include the follow HTML code from an authorized third party, in this case one associated with the fictional domain "3rdparty.com":

<script src="http://3rdparty.com/writePixel.js"></script>

However, writePixel.js in the above example may contain something like the following:

document.write('<img src="http://blacklisted.com/?make=bmw&model=5-series&price=50000-70000"/>');

In the above example, an authorized third party ("3rd-party") has included on the publisher's page a tag that results in a call not authorized by the publisher being made out to a site associated with an unauthorized third party ("blacklisted"), which in this example results in user data being passed to the unauthorized third party, for example cookie data stored on the user's computer. Using the data that is passed along with the unauthorized call, the third party ("blacklisted.com") is now able to track that user as one being in-market for high-end luxury cars.

These unwanted requests may have unwanted affects, such as:
 Devaluing the publishers online advertising inventory by making their audience's data available to channels not controlled by the publisher, ultimately decreasing revenue for the publisher.
 Increasing web page load time for end users with additional HTTP traffic. In addition to creating a poorer experience for end users, this leads to lower revenue for the publisher when end-users abandon sites or visit fewer pages because the web pages are slow.
 Compromising the privacy of the users by having their data shared with unauthorized companies. With an evolving privacy regime, unwarranted distribution of user's data is a big concern for Publishers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to block unauthorized third party requests associated with code associated with a first party publisher's web page are disclosed. In various embodiments, a data countermeasures platform is provided, which may include one or more of the components and features described herein.

Figure 1:
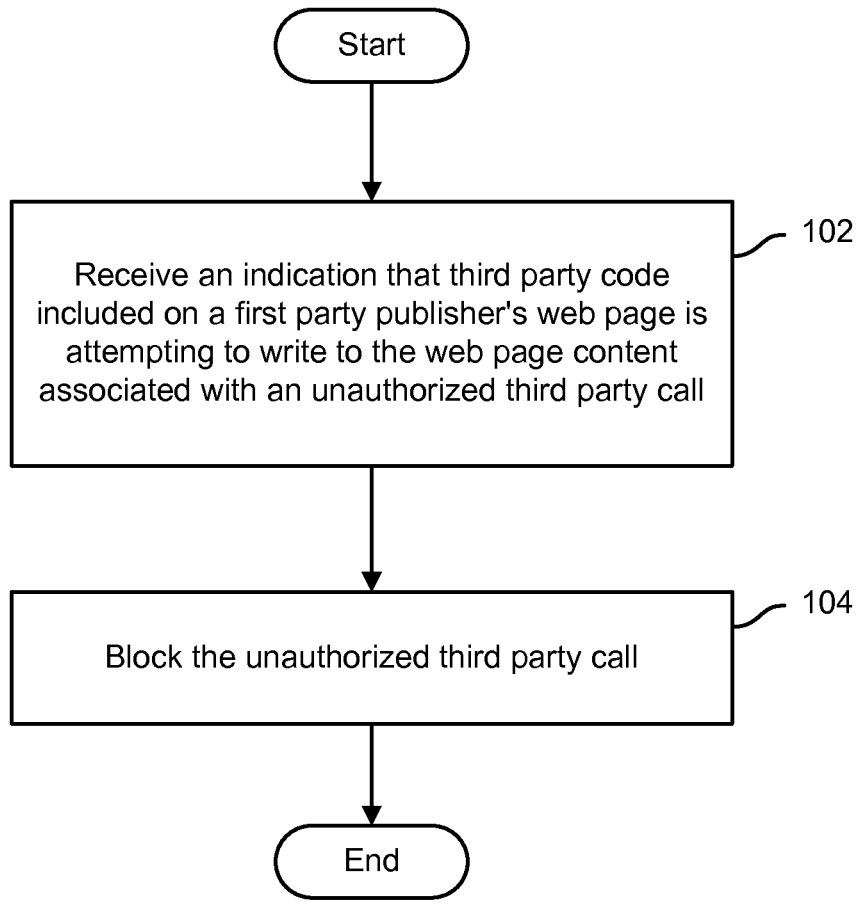
FIG. 1 is a flow diagram illustrating an embodiment of a process to block unauthorized third party calls.

FIG. 1 is a flow diagram illustrating an embodiment of a process to block unauthorized third party calls. In the example shown, an indication is received that third party code included on a first party publisher's web page is attempting to write to the web page content associated with an unauthorized third party call (102). For example, third party JavaScript or other code included with authorization on the publisher's web page may attempt to write to the web page as rendered by a client system's browser an element that would cause a call, such as an HTTP or other request, to be made out to an unauthorized third party, resulting in unauthorized transfer of user or other data to the unauthorized third party. In the example shown, the unauthorized third party call is blocked (104). In some embodiments, the call is blocked by modifying the content to be written to the web page in a manner that results in the client browser not making the unauthorized third party call.

Figure 2:
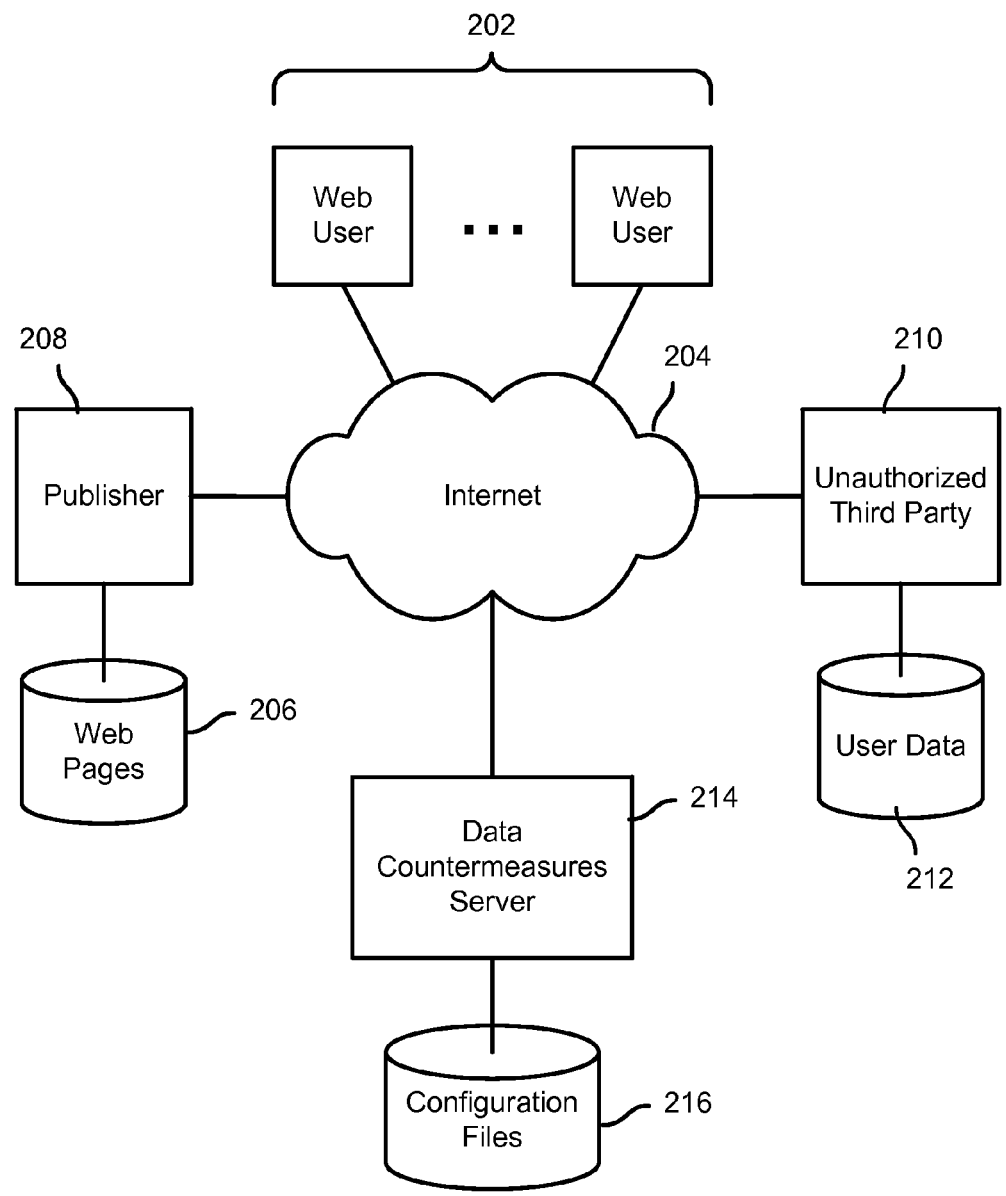
FIG. 2 is a block diagram illustrating an embodiment of a system to block unauthorized third party calls.

FIG. 2 is a block diagram illustrating an embodiment of a system to block unauthorized third party calls. In the example shown, web users 202 use the Internet 204 to access web pages 206 from a publisher or other web server 208. In the example shown, an unauthorized third party 210 attempts to gather user data from and about web users 202 who view the publisher 208's web pages 206, e.g., to populate a user data database 212. For example, the unauthorized third party may desire to sell to entities other than publisher 208 information about the online behavior of web users 202 who have viewed publisher 208's web pages 206. In the example shown, the publisher 208 uses a service provided via a data countermeasures server 214 and a configuration data store 216 to block unauthorized calls from its web pages.

In various embodiments, a body of JavaScript and/or other code is provided that, when included on the web page by the online publisher, examines requests as they come in from third parties. If the publisher has disallowed requests from that particular party, for example, as indicated by data included in the configuration files 216, the request is blocked. In some embodiments, the JavaScript and/or other code comprises a "control tag" or other code that is provided to the publisher to be embedded by the publisher in the publisher's web pages.

Figure 3:
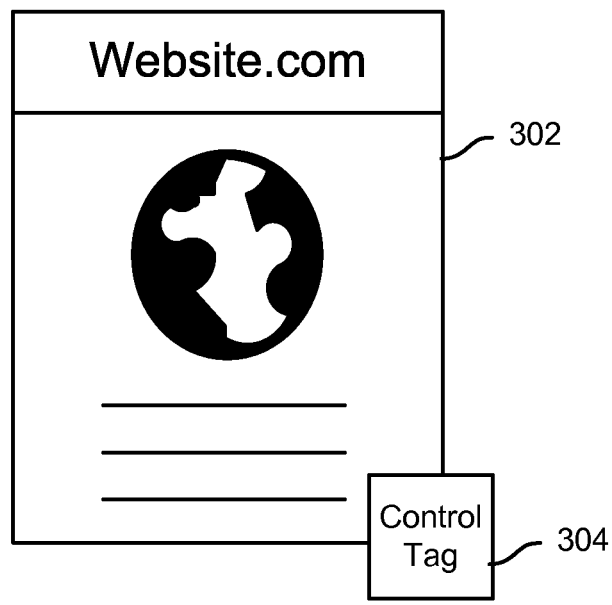
FIG. 3 is a block diagram illustrating an embodiment of a web page in which a control tag has been embedded to block unauthorized third party calls.

FIG. 3 is a block diagram illustrating an embodiment of a web page in which a control tag has been embedded to block unauthorized third party calls. In the example shown, a publisher of web page 302 has embedded a control tag 304 in the web page.

In some embodiments, the control tag overrides the native behavior of document.write, JavaScript's built in method for writing html to the page. By intercepting calls to this function, the control tag buffers the content being passed to it. The content is processed with an html processor, with a callback function called whenever an opening html tag is called. This callback function is called with a list of the attributes in the opening tag. The attributes of incoming tags are inspected, and compared against the allowed tags/attributes as specified by the publisher. If a disallowed third party call is found, the html is removed and/or modified so that the browser does not execute it.

For example, if the 3rd party calls:
   document.write("<img   src='"+'http://www.bl'+'ocked.com/pixel.gif'>")

The control tag will parse the html passed to document.write, resulting in:
   <img src='http://www.blocked.com/pixel.gif'>

Before writing it to the page, the "src" (source) attribute will be checked against the publisher's blacklisted domains. If the content is to be blocked, it will be modified so that the browser does not execute it, such as:
   <img blockedsrc='http://www.blocked.com/pixel.gif'>

The control tag in some embodiments also overrides other native elements that may be used to create html on the page in the same manner, such as Image and document.createElement.

In various embodiments, publishers are provided a way, e.g., a web-based administrative interface, to select companies that are to be blocked, based in some embodiments on proprietary or other databases of online third parties mapped to urls/domain names. In some embodiments, a data counter measures service provider builds and maintains a database of third party companies that show up via HTTP requests on publisher pages. The database is keyed off of the domain portion of the URL. In various embodiments one or both of human and automated processes as used to populate the database. In some embodiments, third party companies are categorized by their industry niche (or based on other attributes or criteria), so that publishers understand what type of company they are, e.g., market research, ad serving, etc. Via an administrative console or other interface, the publisher can choose which companies and/or classes of company to disallow, and the lists of these companies and domain patterns are delivered to the web page via a control tag or other mechanism, as described more fully herein. In some embodiments, use of a control tag embedded in a publisher's web page to retrieve and/or update configuration at runtime allows for new third party companies, domains, etc. to be blocked within minutes.

Figure 4:
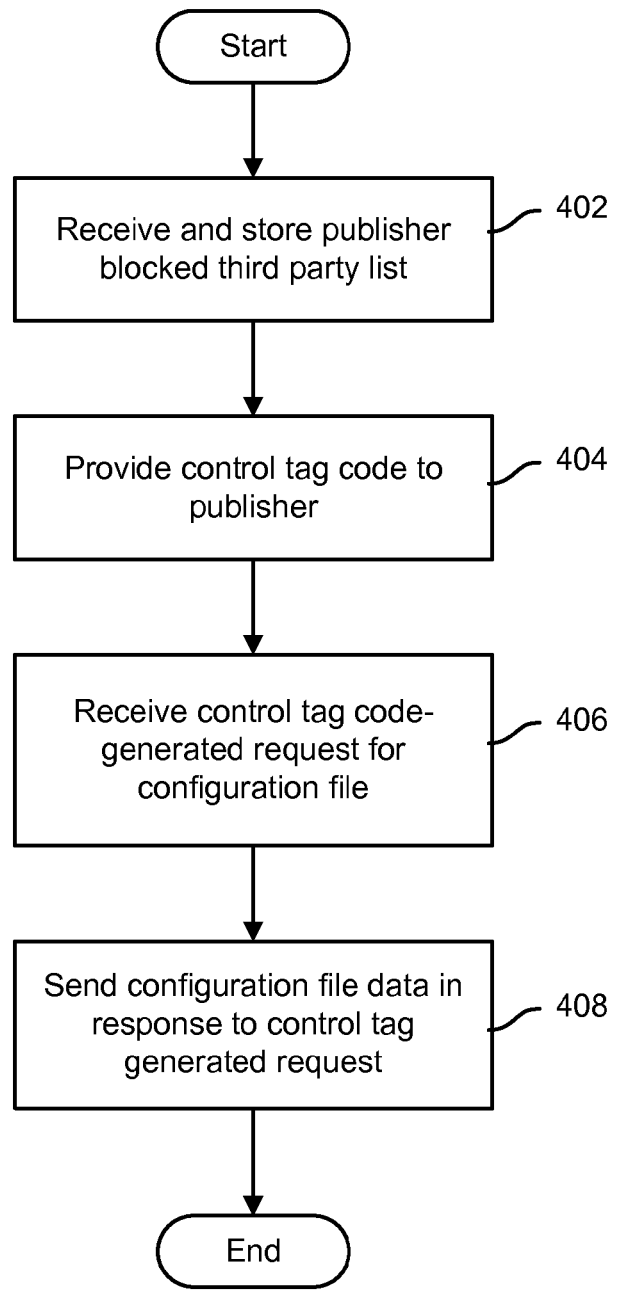
FIG. 4 is a flow diagram illustrating an embodiment of a process to configure a publisher's web pages to cause unauthorized third party calls to be blocked.

FIG. 4 is a flow diagram illustrating an embodiment of a process to configure a publisher's web pages to cause unauthorized third party calls to be blocked. In the example shown, a list of third parties and/or classes of third parties that a particular publisher desires to block is received (402), for example via a web-based or other administrative interface. Control tag code is provided to the publisher (404), who embeds the control tag in web pages desired to be protected. The control tag in various embodiments includes code to retrieve and/or update a list of blocked third parties, e.g., at runtime when a client browser executes code comprising the control tag. A control tag-generated request for configuration file data for the publisher is received (406), and configuration file data is sent in response to the control tag-generated request (408).

In various embodiments, unwanted requests are blocked by taking control of how a web browser writes content to the page (via Javascript's document.write in some embodiments) and changing its behavior so that incoming content can be inspected before it is executed. In various embodiments, the native behavior of one or more of JavaScript's document.createElement, Image tag, and other functions that allow for unauthorized HTTP transactions to be performed are overwritten to intercept, detect, and block unauthorized third party calls. By processing HTML as it is being written to a web page, and using a hook mechanism to call out to a data counter measures module or other entity every time a new tag is written to the page, tags can be inspected for validity before they are written.

Figure 5:
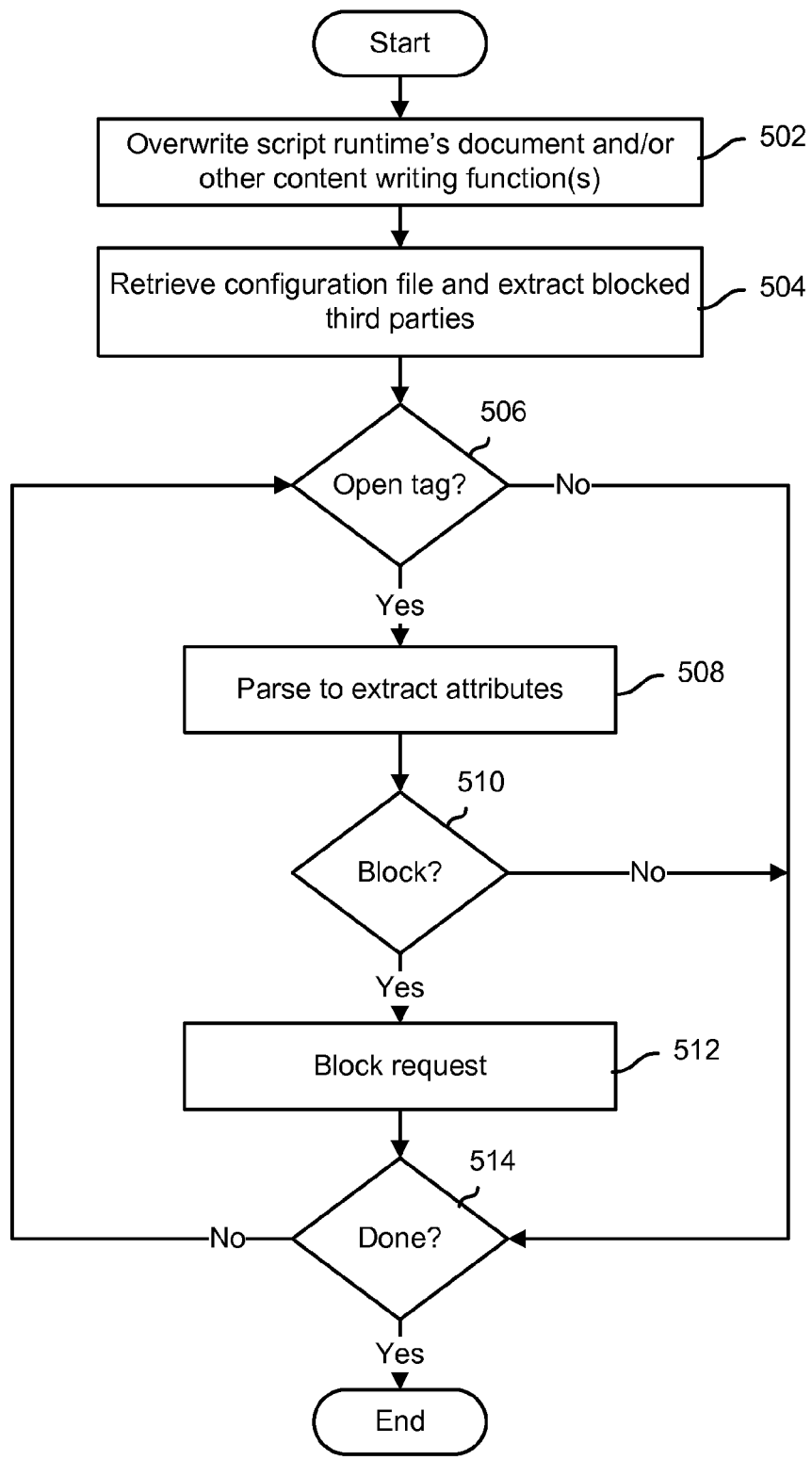
FIG. 5 is a flow diagram illustrating an embodiment of a process to block unauthorized third party calls.

FIG. 5 is a flow diagram illustrating an embodiment of a process to block unauthorized third party calls. In some embodiments, the process of FIG. 5 is implemented by a control tag and/or associated code. In the example shown, a JavaScript or other script runtime's document and/or other content writing function(s) is/are overwritten (502), e.g., to enable the writing of content that may otherwise result in an unauthorized call (e.g., an HTTP or other request) to be detected and blocked. A configuration file and/or other source of a list of blocked third parties is retrieved and processed (504). As the page is processed, upon encountering an open tag (506) the tag is parsed to extract attributes (508), e.g., the "src" or other content source attribute. If a relevant attribute is associated with a third party on the publisher's list of third parties to block (510), actions are performed to block the call from being made to the third party (512), such as by modifying data comprising the tag to cause the browser not to make the unauthorized third party call. Processing of the web page continues in this way until no other tags remain to be processed (514).

In some embodiments, an optional reporting component is made available. Every time a request is blocked, a reporting call is sent back to a data counter measures service provider or other reporting destination, so that data can be gathered, aggregated, summarized and displayed to the publisher, so they may know how many requests where blocked.

Techniques to intercept and block HTTP requests, e.g., by checking content before it is written to the page, have been disclosed. An alternative approach would be to remove the unwanted content from the web page after it has been downloaded, but by this time the HTTP request has already been sent to the unwanted party, passing along the end-users cookie information, which may be part of what the publisher wanted to block.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of blocking unwanted calls, comprising:
   generating, by an authorized third party code included on a web page, a third party call to a web server, wherein the third party call is associated with content that the authorized third party code is attempting to write to the web page;
   intercepting the third party call from the authorized third party code included on the web server to the web server at least in part by overriding, by a control tag included in code of the web page, a behavior of a content writing function associated with the web page to inspect content before the content is written to the web page;
   determining that the third party call is to an unauthorized third party; and
   at least partially in response to determining that the third party call is to an unauthorized third party, blocking the third party call, at least in part by modifying data comprising a tag to cause the browser not to execute the third party call.

2. The method of claim 1, wherein blocking the third party call comprises blocking content associated with the unauthorized third party from being written to the web page.

3. The method of claim 2, wherein the content associated with the unauthorized third party is blocked from being written to the web page at least in part by replacing the content associated with the unauthorized third party with other content not associated with any unauthorized third party.

4. The method of claim 1, wherein the third party call comprises a hypertext transfer protocol (HTTP) request.

5. The method of claim 1, wherein the authorized third party code included on the web page comprises hypertext markup language (HTML) code.

6. The method of claim 1, wherein the authorized third party code included on the web page comprises JavaScript code.

7. The method of claim 1, wherein the authorized third party code included on the web page comprises code that invokes a function to write content to the web page.

8. The method of claim 1, wherein the authorized third party code included on the web page comprises JavaScript code that invokes a document write function of JavaScript.

9. The method of claim 1, wherein the intercepting of the third party call includes intercepting a call to a function to write content to the web page.

10. The method of claim 9, wherein determining that the third party call is to an unauthorized third party includes parsing the call to determine a called source attribute.

11. The method of claim 10, wherein determining that the third party call is to an unauthorized third party further includes determining that the called source attribute is associated with the unauthorized third party.

12. The method of claim 11, wherein determining that the called source attribute is associated with the unauthorized third party includes comparing the called source attribute to a list of domains associated with one or more unauthorized third parties.

13. The method of claim 1, further comprising receiving, from a first party publisher associated with the web page, a second indication that the unauthorized third party is unauthorized.

14. The method of claim 13, wherein receiving from the first party publisher the second indication that the unauthorized third party is unauthorized includes receiving from the first party publisher an indication that the first party publisher desires to block third party calls associated with a class of third party with which the unauthorized third party is associated.

15. A system to block unwanted calls, comprising:
   a processor configured to:
   generate, by an authorized third party code included on a web page, a third party call to a web server, wherein the third party call is associated with content that the authorized third party code is attempting to write to the web page;
   intercept the third party call from the authorized third party code included on the web server to the web server at least in part by overriding, by a control tag included in code of the web page, a behavior of a content writing function associated with the web page to inspect content before the content is written to the web page;
   determine that the third party call is to an unauthorized third party; and
   at least partially in response to determining that the third party call is to an unauthorized third party, block the third party call, at least in part by modifying data comprising a tag to cause the browser not to execute the third party call; and
   a memory coupled to the processor and configured to provide the processor with instructions.

16. The system of claim 15, wherein to block third party call the processor is further configured to block content associated with the unauthorized third party from being written to the web page.

17. The system of claim 16, wherein the content associated with the unauthorized third party is blocked from being written to the web page at least in part by replacing the content associated with the unauthorized third party with other content not associated with any unauthorized third party.

18. The system of claim 15, wherein the third party call comprises a hypertext transfer protocol (HTTP) request.

19. The system of claim 15, wherein to receive the indication the processor is further configured to intercept a call to a function to write content to the web page.

20. A computer program product to block unwanted calls, the computer program product being embodied in a tangible, non-transitory computer readable storage medium and comprising computer instructions for:
   generating, by an authorized third party code included on a web page, a third party call to a web server, wherein the third party call is associated with content that the authorized third party code is attempting to write to the web page;
   intercepting the third party call from the authorized third party code included on the web server to the web server at least in part by overriding, by a control tag included in code of the web page, a behavior of a content writing function associated with the web page to inspect content before the content is written to the web page;

determining that the third party call is to an unauthorized third party; and at least partially in response to determining that the third party call is to an unauthorized third party, blocking the third party call, at least in part by modifying data comprising a tag to cause the browser not to execute the third party call.

21. The computer program product of claim 20, wherein blocking the third party call comprises blocking content associated with the unauthorized third party from being written to the web page.

22. The computer program product of claim 21, wherein the content associated with the unauthorized third party is blocked from being written to the web page at least in part by replacing the content associated with the unauthorized third party with other content not associated with any unauthorized third party.

23. The computer program product of claim 20, wherein the authorized third party code included on the web page comprises code that invokes a function to write content to the web page.

24. The computer program product of claim 20, wherein the intercepting of the third party call includes intercepting a call to a function to write content to the web page.

25. The method of claim 1, wherein determining that the third party call is to the unauthorized third party comprises:

updating, using a control tag included in code of the web page, a list of unauthorized third parties;

extracting a domain attribute from a tag associated with the third party call; and determining that the domain attribute extracted from the tag is associated with the unauthorized third party in the list of unauthorized third parties.

26. The method of claim 25, wherein extracting the domain attribute comprises:

identifying an open tag included in the tag associated with the third party call;

parsing the tag to identify the domain attribute; and extracting the domain attribute.

27. The method of claim 1, further comprising:

reporting the blocking of the third party call to a publisher of the web page.

28. The method of claim 27, wherein the reporting of the blocking of the third party call includes sending information associated with the blocking of the third party call to a data counter measures service provider.

* * * * *